July 5, 1927.
I. F. FRAVEL
MOORING MAST
Filed Nov. 15, 1924
1,634,989
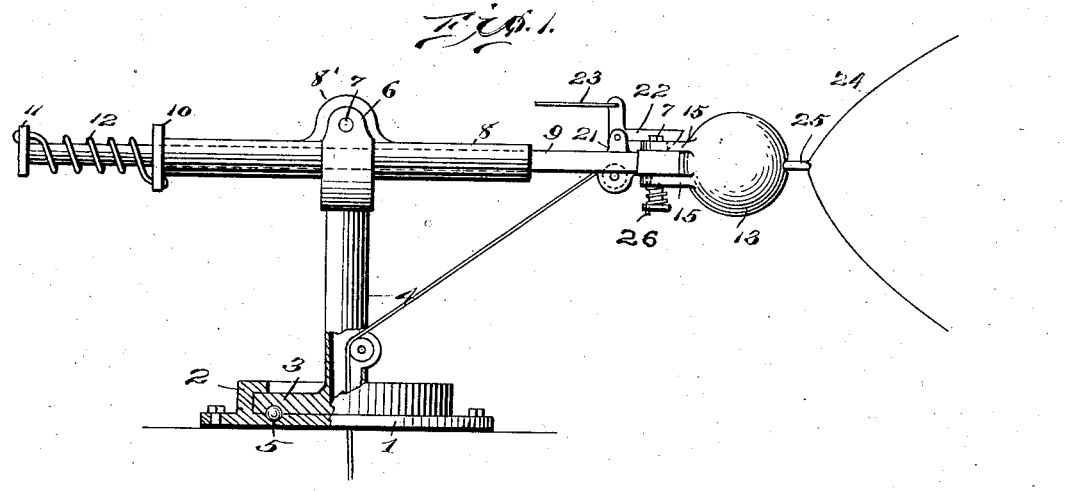
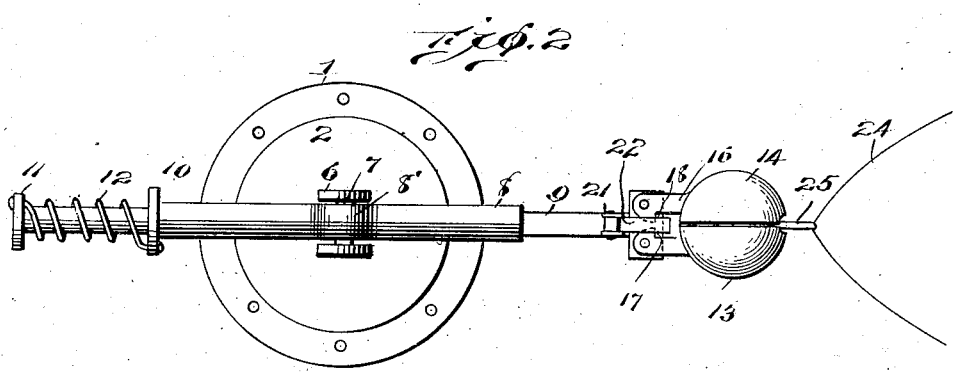
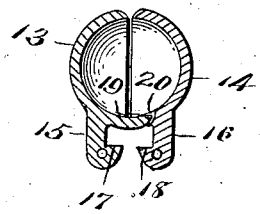
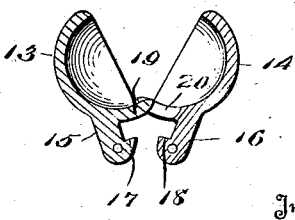
Inventor
Ira F. Fravel
By Robert H Young
Attorney Patented July 5, 1927.

1,634,989

UNITED STATES PATENT OFFICE.

IRA F. FRAVEL, OF WASHINGTON, DISTRICT OF COLUMBIA.

MOORING MAST.

Application filed November 15, 1924. Serial No. 750,143.

This invention relates to mooring devices for lighter-than-air craft designed to enable such aircraft to be moored in the open without protection against wind.

The object of this invention is to moor aircraft in such a manner as to permit movement thereof in any direction in relation to the mast.

A further object is to provide a mast which will lessen the strain on the aircraft by providing a safe but yielding attachment which will protect the aircraft against strains due to sudden gusts of wind.

To this end it is proposed to provide a rotatably mounted upright having a transverse member pivotally connected thereto and capable of pivotal movement in a vertical plane. It is also proposed to provide the transverse member with a novel and effective hollow spherical attachment for automatically receiving and retaining a rigid ball integral with the aircraft to be moored. In accordance with the usual practice the mast is to be provided with shock-absorbing means.

With the foregoing, and other objects in view, the invention consists in the combination of parts and in the details of construction hereinafter described, certain embodiments of the invention being illustrated in the accompanying drawings, in which:

Fig. 1 is a view in side elevation, partly in section, of the mooring mast with the aircraft in moored position, only a portion of the aircraft being shown.

Fig. 2 is a top plan view of that shown in Fig. 1.

Fig. 3 is a detail view in cross section of the hollow spherical retaining means in closed and operative position.

Fig. 4 is a similar view showing the same in opened and inoperative position.

Referring more particularly to the drawings the mooring device is provided with a base plate 1 with an angular upturned circular flange 2 to receive and retain the circular base portion 3 of the upright 4. The opposing surfaces of the base portion 3 and base plate 1 are provided with suitable circular recesses conforming to a ball race to receive the balls 5, thus forming a ball bearing assembly to allow the base portion 3 to rotate freely in the base plate 1.

The upright 4 is provided with forked arms 6 at its upper extremities, the arms 6 having a pin 7 attached thereto and extending therebetween. A hollow tube 8 is pivotally mounted on the pin 7 and is provided with a shaft 9 extending through the tube 8 in sliding relation, the pin 7 extending through a raised portion 8' on the tube 8 to permit sliding of the shaft 9. The hollow tube 8 has at one end a shoulder 10 and the shaft 9 a shoulder 11. A coil spring 12 is attached to both shoulders 10 and 11 and is coiled about the rod 9 to provide a means to absorb shock imparted at the opposite end of the rod 9.

A hollow spherical coupling member consisting of two substantially half spheres or segments 13 and 14, each of which has a pair of extensions as at 15 and 16, the extensions, in turn, having locking shoulders 17 and 18, are shown in detail in Figs. 3 and 4. The segment 13 has a lip 19 which rests in a corresponding recess 20 of the other segment 14, so that when the two segments 13 and 14 are brought together the inner surface of the two, combined, conforms to the shape of a sphere.

When the spherical coupling is in open position as shown in Fig. 4 and the conventional ball coupling stud is inserted therein, the pressure exerted on the lip 19 causes the two half-spheres 13 and 14 to close, against the action of the springs 26, the latter tending to keep the two in open position. In order to retain the segments 13 and 14 in closed position, a pawl 22 is pivotally mounted on the lug 21 of the shaft 9, the pawl being adapted to rest between the shoulders 17 and 18 to prevent pivotal movement of the segments 13 and 14. The pawl 22 may be either a gravity pawl with a control cable 23 or may be spring-actuated as may be considered advisable.

The nose of the dirigible is illustrated at 24 with the usual rod 25 to which the conventional coupling stud is attached, this being so well known in the art as to not be dwelled upon in detailed description.

Having thus described my invention, I claim:—

1. A rigid airship mooring mast comprising an upright capable of rotary movement within a base plate, a horizontally extending tube having a point intermediate the ends thereof attached to said upright in such a manner as to allow of pivotal movement of the tube upwardly and downwardly in a vertical plane about said upright as a pivot, a shaft extending through and slidable in said tube, resilient means interposed between adjacent ends of said tube and shaft, a hollow spherical coupling member pivotally connected to said shaft and adapted to receive and retain the coupling stud of said airship.

2. A rigid airship mooring mast comprising an upright capable of rotary movement within a base plate, a horizontally extending tube having a point intermediate the ends thereof attached to said upright in such a manner as to allow of pivotal movement of the tube upwardly and downwardly in a vertical plane about said upright as a pivot, a shaft extending through and slidable in said tube, resilient means interposed between adjacent ends of said tube and shaft, a hollow spherical coupling member pivotally connected to said shaft and adapted to receive and retain the coupling stud of said airship, said spherical coupling member comprising two segments pivotally mounted on a common pin, one of said segments having a lip to bridge the gap between said segments at one point, the other segment having a recess to receive said lip, said lip being adapted to effect a closing of the coupling member when pressure is applied to said lip.

3. An airship mooring mast comprising an upright capable of rotary movement within a base plate, a horizontally extending tube attached to said upright in such a manner as to allow of pivotal movement of the tube in a vertical plane, a shaft extending through and slidable in said tube, resilient means interposed between adjacent ends of said tube and shaft, a hollow spherical coupling member pivotally connected to said shaft and adapted to receive and retain the coupling stud of said airship, said spherical coupling member comprising two segments each pivotally mounted on a pin, one of said segments having a lip to bridge the gap between said segments at one point, the other segment having a recess to receive said lip, said lip being adapted to effect a closing of the coupling member when pressure is applied to said lip, spring means for normally maintaining said coupling member in opened position, and further means for locking said member in closed position when closed.

4. An airship mooring mast comprising an upright capable of rotary movement within a base plate, a horizontally extending tube attached to said upright in such a manner as to allow of pivotal movement of the tube in a vertical plane, a shaft extending through and slidable in said tube, resilient means interposed between adjacent ends of said tube and shaft, a hollow spherical coupling member pivotally connected to said shaft and adapted to receive and retain the coupling stud of said airship, said spherical coupling member comprising a pair of segments having integral arms mounted on a common pin, said arms having inturned shoulders, a pawl pivotally mounted on said shaft, one of said segments having a lip to bridge the gap between said segments at one point, the other segment having a recess to receive said lip, said lip being adapted to effect a closing of the coupling member when pressure is applied to said lip, and said pawl being adapted to fall between the shoulders of said segment arms to lock said segments in closed position.

In testimony whereof I affix my signature.

IRA F. FRAVEL.